US012470882B2

(12) United States Patent
Serman et al.

(10) Patent No.: US 12,470,882 B2
(45) Date of Patent: Nov. 11, 2025

(54) PROCESS FOR FITTING A HEARING DEVICE

(71) Applicant: Sivantos Pte. Ltd., Singapore (SG)

(72) Inventors: Maja Serman, Erlangen (DE); Claudia Pischel, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 312 days.

(21) Appl. No.: 18/308,855

(22) Filed: Apr. 28, 2023

(65) Prior Publication Data

US 2023/0362564 A1 Nov. 9, 2023

(30) Foreign Application Priority Data

May 4, 2022 (DE) ..................... 10 2022 204 377.4

(51) Int. Cl.
*H04R 25/00* (2006.01)

(52) U.S. Cl.
CPC .................................... *H04R 25/70* (2013.01)

(58) Field of Classification Search
CPC .............................. H04R 25/70; H04R 25/558
See application file for complete search history.

(56) References Cited

U.S. PATENT DOCUMENTS 11,122,375 B2 * 9/2021 Westergaard ........ H04R 25/554

* cited by examiner

*Primary Examiner* — Brian Ensey
(74) *Attorney, Agent, or Firm* — Laurence A. Greenberg; Werner H. Stemer; Ralph E. Locher

(57) ABSTRACT

In a method for fitting a hearing device, a signal amplification is set or adapted on the basis of an ototoxic hearing loss. An input transducer picks up an acoustic signal and converts it into an input signal, a signal processing device processes the input signal and generates an output signal, and an output transducer converts the output signal into a sound signal. The signal processing of the signal processing device is set or adapted in dependence on the ototoxic hearing loss of the hearing device user.

7 Claims, 1 Drawing Sheet

PROCESS FOR FITTING A HEARING DEVICE

FIELD AND BACKGROUND OF THE INVENTION

The invention relates to a method for fitting a hearing device. The invention furthermore relates to a hearing system having a hearing device and software on a data carrier.

Hearing aids are wearable hearing devices (hearing aid devices) which are used for the treatment of the hard of hearing or the hearing-impaired. To meet the numerous individual requirements, different structural forms of hearing devices are provided, such as behind-the-ear hearing aids (BTE) and hearing aids having an external receiver (RIC: receiver in the canal) as well as in-the-ear hearing aids (ITE), for example also pinna hearing aids or canal hearing aids (CIC: completely-in-channel, IIC: invisible-in-the-channel). The hearing aids listed by way of example are worn on the outer ear or in the auditory canal of a hearing device user. In addition, however, bone vibrator hearing aids, implantable hearing aids, or vibrotactile hearing aids are available on the market. In this case, the damaged sense of hearing is stimulated either mechanically or electrically.

Such hearing devices have in principle as essential components an input transducer, an amplifier, and an output transducer. The input transducer is generally an acoustoelectric transducer, such as a microphone, and/or an electromagnetic receiver, for example an induction coil or a (radiofrequency, RF) antenna. The output transducer is usually implemented as an electroacoustic transducer, for example as a miniature loudspeaker (receiver), or as an electromechanical transducer, for example a bone vibration receiver. The amplifier is typically integrated into a signal processing device. The energy supply is typically carried out by a battery or a chargeable accumulator.

The input signals recorded by the input transducers are typically multichannel, this means that the input signals are divided into multiple individual frequency channels, wherein each frequency channel covers a frequency band of a certain spectral width. For example, in this case a hearing aid can include 48 (frequency) channels in a frequency range between 0 kHz (kilohertz) and 24 kHz, wherein the individual signal components of the input signal can be individually processed in the channels by means of the signal processing device, in particular can be individually filtered and/or amplified.

An optimum fitting to the needs of a hearing device user can be achieved by skilled setting of the time-dependent and frequency-dependent amplification of an acoustic input signal by a hearing device. The problem results in this case of finding a rule or an algorithm which can determine an optimum time-dependent and frequency-dependent amplification for arbitrary, in particular also time-variant speech signal/interference signal mixtures.

So-called fitting formulas are used, for example, for the (initial) fitting of the signal amplification and hearing aid parameters of the hearing device. The goal in this case is to bring the settings of the hearing device, in particular the amplification in the individual frequency ranges or frequency channels, as close as possible to the personal or specific requirements of the respective hearing device user.

These fitting formulas or rules can be designed, for example, to improve the speech comprehension, the localization, the sound quality, the recognition of ambient noises, or the (sound) naturalness. Such fitting formulas can be embodied linearly, for example, to predict the amplification for hearing devices using fixed amplification and frequency response curves for the various input levels. Nonlinear fitting formulas calculate various amplification values as a function of the input level and were developed for hearing devices having wide dynamic range compression (WDRC).

Currently, common fitting formulas are, for example, NAL-NL-2 and DSLm I/O v5. In this case, in addition to the amplifications, the fitting formulas also take into consideration personal and psychoacoustic aspects of the hearing device user, for example age, sex, experience with hearing aids, and speech type. The parameters for the fitting formulas are generally determined on the basis of audiometric values in the context of the hearing device fitting by means of a pure tone audiogram (PTA).

The current fitting strategies are directed in this case in particular to age-related hearing loss (so-called presbycusis). The progress of such hearing loss is assumed to be very slow in this case. In these fitting strategies, the hearing device parameterization is based on an assumed static relationship between the hearing loss and the audiometric measured values (i.e., the hearing threshold).

"Ototoxic" or "ototoxicity" refers here and hereinafter to a (generally undesired) destructive effect of substances on the inner ear, in particular the sensory cells of the hearing and equilibrium organ, or the associated cranial nerves. Ototoxic active ingredients and medications, for example cisplatin, thus inevitably cause a hearing loss, and do so in a known dose/frequency, which corresponds to cochlea pathology mapping.

The progress of an ototoxic medication-related hearing loss generally does not follow the nature and speed of an age-related hearing loss and therefore requires a different (for example faster) hearing loss diagnosis, progress prediction, and corresponding hearing aid fitting strategy.

Statistically, for example, approximately 93% of the patients who receive chemotherapy develop progressive hearing loss. Furthermore, research shows that patients who have been treated using ototoxic medications often underestimate the hearing loss linked thereto, since the psychological stress due to the underlying illness, because of which they are treated, is too high (Ardeshirrouhanifard, Shirin, et al. "Hearing loss after cisplatin-based chemotherapy: Patient-reported outcomes versus audiometric assessments." (2021): 5016-5016).

For example, a smart phone application (app) is known in which hearing test results are interpreted and recommendations for dose adjustment for adult patients having tuberculosis are provided (Hollander, Cara, Karin Joubert, and Natalie Schellack. "An Ototoxicity Grading System Within a Mobile App (OtoCalc) for a resource-limited setting to guide grading and management of drug-induced hearing loss in patients with drug-resistant tuberculosis: prospective, cross-sectional case series." JMIR mHealth and uHealth 8.1 (2020): e14036). An assessment of the hearing loss after an ototoxic medication treatment, a corresponding specific compensation strategy, or a corresponding hearing aid parameterization are not known, however.

The technical problem in this case is the lack of hearing loss warnings (indication) and hearing aid fitting strategies (rational) for ototoxic hearing losses in general and in dependence on the medication dose and the treatment frequency.

SUMMARY OF THE INVENTION

The invention is therefore based on the object of specifying a hearing aid fitting or fitting for a hearing device which is especially directed to an ototoxic hearing loss. The invention is based in particular on the object of specifying a particularly suitable method for fitting a hearing device. The invention is furthermore based on the object of specifying a particularly suitable hearing system and particularly suitable software for carrying out the method.

The object is achieved according to the invention with respect to the method as claimed and with respect to the hearing system as claimed and with respect to the software as claimed. Advantageous embodiments and refinements are the subject matter of the dependent claims. The advantages and embodiments set forth with regard to the method are also transferable correspondingly to the hearing system and/or the software and vice versa.

Insofar as method steps are described hereinafter, advantageous embodiments for the hearing system result in particular in that it is designed to execute one or more of these method steps.

The method according to the invention is provided for fitting a hearing device, in particular a wearable hearing device, for example a hearing aid system, and is suitable and configured for this purpose. The hearing device is also designated hereinafter as a hearing aid system or hearing aid. The hearing device is in particular part of the hearing system.

The hearing device is used in particular to treat a hearing-impaired user (hearing device user). The hearing device is designed in this case to pick up sound signals from the surroundings and output them to the hearing device user. For this purpose, the hearing device includes at least one input transducer, in particular an acoustoelectric transducer, for example a microphone. The input transducer picks up sound signals (noises, tones, speech, etc.) from the surroundings in operation of the hearing device and converts each of them into an electrical input signal. The input signal is embodied as multichannel in particular in this case. In other words, the acoustic signals are converted into a multichannel input signal. The input channel thus includes multiple frequency channels, in particular at least two, preferably at least 20, particularly preferably at least 40, for example 48 (frequency) channels, which each cover an assigned frequency band of the frequency range of the hearing aid. For example, in this case a frequency range between 0 kHz and 24 kHz is divided into 48 channels, so that input signals having 48 channels are generated.

The hearing device furthermore includes an output transducer, in particular an electroacoustic transducer, for example a receiver or miniature loudspeaker. An electrical (multichannel) output signal is generated from the electrical (multichannel) input signal, in that the input signal, or the individual frequency or signal channels, are processed and modified (e.g., amplified, filtered, damped) in a signal processing device. The setting of the signal processing device, in particular with respect to the signal amplification, takes place according to the invention in the course of the fitting on the basis of an ototoxic hearing loss of the user. In other words, the signal amplification of the signal processing device is set or adjusted in dependence on an ototoxic hearing loss of the hearing device user. A particularly suitable method for fitting a hearing device is thus implemented.

According to the invention, a wearable hearing aid system or hearing system is thus provided, which is provided for a hearing loss diagnosis and a fitting method and is suitable and configured for this purpose. The hearing loss diagnosis and/or fitting method begins in this case, for example, during the administration of an ototoxic medication (for example chemotherapy) and is (are) continuously adapted in the course of time on the basis of a predicted hearing loss progression and severity.

A hearing loss, or a future course, is thus predicted or estimated. "Prediction" or "predicting" is to be understood here and hereinafter in particular as a predictive estimation, thus a prediction, in which on the basis of current and/or past hearing data—possibly with the addition of mathematical or physical models—a future hearing loss or a hearing loss to be expected of the user is calculated or predicted, which occurs with a sufficient probability. Which probability is considered to be sufficient in this case and how high the probability specifically is, is initially secondary in this case. This may be determined, for example, from past hearing data or from corresponding (statistical) studies or tests.

"Estimation" or "estimate" is to be understood here and hereinafter as an approximate determination of the (future) hearing loss by evaluation of the present or past hearing loss, for example by inspection, pre-characterized measurements, stored tables or characteristic curves, or by means of statistical-mathematical methods.

The determination of the ototoxic hearing loss can take place in this case in particular on the basis of data which are collected in the course of time in a large population of patients having ototoxic medications. The hearing aid system could thus learn various fitting times.

The method according to the invention can be divided for this purpose, for example, into three method steps, an observation phase, a forecast (prediction/estimation) or diagnosis, and a fitting. In one preferred embodiment, it is therefore provided according to the invention that in the course of a treatment of the hearing device user with an ototoxic medication or with an ototoxic active ingredient, an observation step and a forecast step and also a fitting step are carried out.

At least one treatment parameter is acquired and stored in the observation step. The observation step comprises for this purpose the initial observation phase during the treatment and medication consumption of the user using ototoxic active ingredients/medications. In particular the medication dosing and the consumption plan are acquired and stored in a memory during the treatment as treatment parameters. Additionally or alternatively, the hearing aid system or the hearing device can be provided and configured to measure the pulse and further cardiac values, temperature, etc. of the user as treatment parameters and to inform the user or medical personnel (for example physician) in the event of irregularities.

In the forecast step, an ototoxic hearing loss or a predicted chorus of the ototoxic hearing loss is forecast, thus estimated or predicted, on the basis of the at least one stored treatment parameter. For the forecast or diagnosis, the hearing aid system determines, for example, based on the data of the ototoxic treatment (such as dosing and frequency of the administration of ototoxic medications):

an (expected/probable) beginning of the hearing loss,
a (future) progress of the hearing loss,
the cochlea pathology, and
the risk of auditory neuropathy.

The progress of the hearing loss, or the forecast future course of the hearing loss, can be indicated for this purpose, for example, by a change of the audiogram and the need for hearing aid amplification in the course of time. Changes of the cochlea pathology can also be indicated by a change of the audiogram and the necessity of a change of the hearing aid compression settings. The medication-induced cochlea pathology and the auditory neuropathy indicate, for example, the shift of the hearing thresholds or the extent of the comprehension in the event of noise.

In the fitting step, the signal amplification of the signal processing device is set or fitted in dependence on the forecast ototoxic hearing loss.

In a suitable embodiment, a model for the ototoxic hearing loss is used in the forecast step and a fitting formula for the ototoxic hearing loss is used in the fitting step.

In one expedient refinement, a predicted beginning for the ototoxic hearing loss is forecast in the forecast step, wherein regular hearing threshold tests are carried out in a period of time around the predicted beginning, and wherein the signal amplification is set in the fitting step on the basis of the hearing threshold tests.

The hearing aid system can thus, for example, also be worn by the user before the occurrence of the hearing loss. For example, the hearing aid system can be used before the predicted hearing loss for listening to music, in the headset mode for hands-free speech in telephone calls, etc. Around the point in time of the beginning of the predicted hearing loss, for example, the hearing aid system carries out regular hearing threshold checks. Thus, for example, a video clip is shown on an associated app or a tone-based or noise-based audiometry is carried out. A compensation of the hearing loss is performed on the basis of the audiometric threshold values thus determinable. In accordance with the predicted hearing loss progression, the hearing loss compensation (fitting or setting of the signal amplification) is regularly changed or adjusted. The hearing loss assessment can optionally be continued regularly or as needed.

Depending on the predicted beginning of the comprehension in the event of interference noises, various hearing aid system strategies can be applied, e.g., interference noise reduction, onset enhancement, or monaural/binaural directionality. Depending on forecast cochlear damage, for example, specific compression parameters are applied.

In this way, the underestimation of hearing loss problems by the user is counteracted in a timely manner and a delayed acquisition of hearing aids and familiarization problems resulting therefrom and a possible cognitive decline are prevented.

In one advantageous embodiment, the fitting step is regularly carried out for a course of the ototoxic hearing loss forecast in the forecast step. The forecast and measured hearing loss strength and progression is thus equalized regularly and using corresponding changes in the hearing aid system fitting (in particular by setting the signal amplification).

As an auxiliary function, for example, health assessment and behavioral education can be carried out. The hearing aid system can measure the pulse and further cardiac values as well as the temperature and inform the wearer/health practitioner in case of irregularities.

The hearing system according to the invention includes a hearing device or hearing aid system having at least one input transducer for picking up an acoustic signal and converting it into an input signal and having a signal processing device for signal amplification of the input signal and generating an output signal and having an output transducer for converting the output signal into a sound signal. The hearing system furthermore includes a controller for carrying out an above-described method.

The controller is generally configured in this case—by programming and/or circuitry—to carry out the above-described method according to the invention. The controller is thus specifically configured to change or set or adjust the signal amplification of the signal processing device on the basis of or in dependence on an ototoxic hearing loss of the hearing device or hearing system user.

In one preferred embodiment, at least the core of the controller is formed by a microcontroller having a processor and a data memory, in which the functionality for carrying out the method according to the invention is implemented by programming in the form of operating software (firmware), so that the method—possibly in interaction with a device user—is carried out automatically upon execution of the operating software in the microcontroller. However, the controller can alternatively also be formed in the scope of the invention by a non-programmable electronic component, such as an application-specific integrated circuit (ASIC) or by an FPGA (field programmable gate array), in which the functionality for carrying out the method according to the invention is implemented using circuitry means.

The controller can, for example, be part of the signal processing device of the hearing device. The controller can also, however, be arranged outside the hearing device, for example. It is also conceivable that the controller or the functionality for carrying out the method is arranged partially in the hearing device and partially outside the hearing device, thus that an internal and an external partial controller are provided, which are coupled to one another for signaling, and carry out the method according to the invention in cooperation.

The hearing device can in one conceivable embodiment be coupled for signaling to a separate mobile operating and display device means. The operating and display device is, for example, a mobile telephone, in particular a mobile telephone having a computer function or a smart phone or also a tablet computer. The operating and display device includes, according to the method, stored application software (operating software), using which the method is carried out. The application software is preferably installable or installed for this purpose as a so-called app or mobile app (mobile application, smart phone app) on the operating and display device. The operating and display device thus acts as a (partial) controller of the hearing system.

This embodiment proceeds here from the consideration that modern operating and display devices, such as smart phones or tablet computers in particular, are widespread in current society and are generally available and accessible at any time for a user. In particular, the user of the hearing aid device has with great probability essentially such an operating and display device in their household.

Modern smart phones are presently furthermore equipped as a standard feature with a variety of sensor means, by which the detection and prediction of the hearing loss or the detection of the consumption of ototoxic active ingredients is implementable in a simple manner. The application software is preferably also suitable and configured in this case for setting operating parameters of the hearing aids, such as a volume. The user thus does not require an additional separate operating system for monitoring the hearing aid device, rather it is possible by (later) downloading and/or installing of the application software to use their already existing smart phone for determining and evaluating the operating or wearing state. User-side costs are advantageously reduced in this way.

The surfaces of smart phones or tablet computers, which are typically designed as touchscreens (indicator, display), furthermore permit particularly simple and intuitive operation of the application software of the operating and display device thus formed. A smart phone or tablet computer can thus be retrofitted particularly cost-effectively for monitoring the hearing aid device.

The operating and display device comprises an internal controller, at least the core of which is formed by a microcontroller having a processor and a data memory, in which the functionality for carrying out the method is implemented by programming in the form of the application software, so that the method or the determination of the operating state of the hearing aids—possibly in interaction with the user—is carried out automatically upon execution of the application software in the microcontroller.

In the case of an app instance of this invention, the app can explain the significance of factors such as high blood pressure, noise pollution, smoking, etc. to the wearer in order to prevent additional damage to the sense of hearing.

An additional or further aspect of the invention provides software on a medium or data carrier for carrying out or executing the above-described method. This means that the software is stored on a data carrier and is provided to execute the above-described method and is suitable and designed for this purpose. Particularly suitable software for the fitting of a hearing device is thus implemented, using which the functionality for carrying out the method according to the invention is implemented by programming. The software is therefore in particular operating software (firmware), wherein the data carrier is, for example, a data memory of the controller.

An exemplary embodiment of the invention is explained in more detail hereinafter on the basis of a drawing. In the schematic and simplified illustrations in the figures:

DETAILED DESCRIPTION OF THE INVENTION

Parts and dimensions corresponding to one another are always provided with the same reference signs in all figures.

Figure 1:
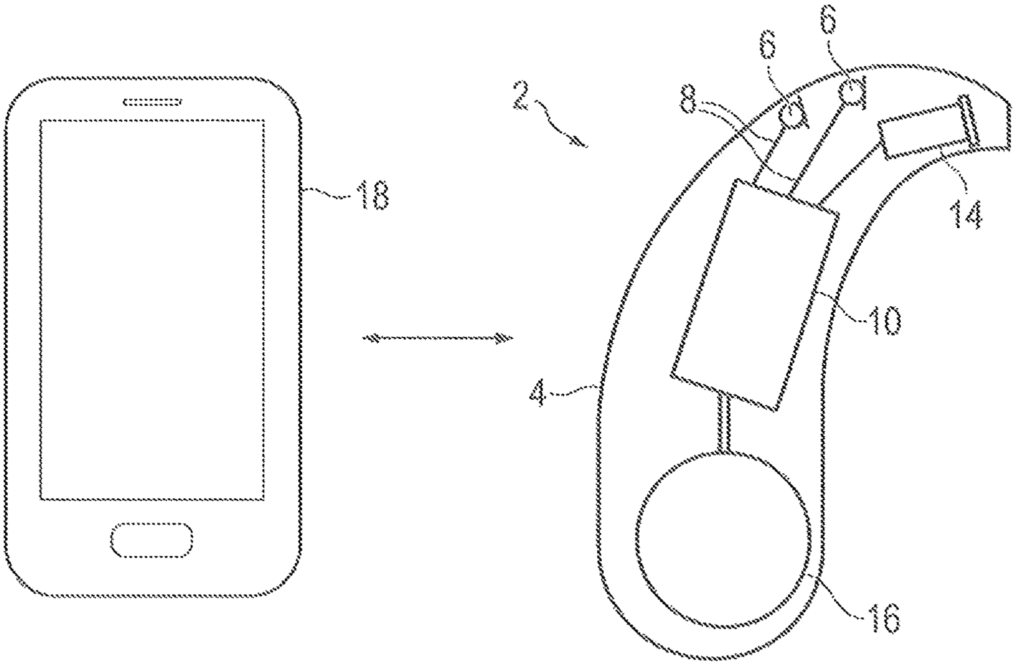
FIG. 1 shows a hearing device.

FIG. 1 shows the fundamental structure of a wearable hearing device 2 or a wearable hearing aid system. The hearing device 2 is designed in this case, for example, as a behind-the-ear (BTE) hearing aid device.

The hearing device 2 comprises, as schematically shown in FIG. 1, a device housing 4, in which one or more microphones, also designated as (acoustoelectric) input transducers 6, are installed. A sound or the acoustic signals in the surroundings of the hearing device 2 are picked up using the input transducers 6 and converted into electrical, multichannel input signals 8. The input signals 8 preferably include multiple frequency channels in this case, for example 48 channels in the frequency range between 0 kHz and 28 kHz.

A signal processing device 10, which is also integrated in the device housing 4, processes the input signals 8. An output signal 12 of the signal processing unit 10 is transmitted to an output transducer 14, which is embodied, for example, as a loudspeaker or receiver and which outputs an acoustic signal. In the hearing device 2, the acoustic signal is possibly transmitted via a sound tube or external receiver (not shown in greater detail), which is connected to an ear mold seated in the auditory canal, to the eardrum of a hearing system user. However, for example, an electromechanical output transducer 14 is also conceivable as a receiver, for example in a bone vibration receiver.

The energy supply of the hearing device 2 and in particular that of the signal processing device 10 is carried out by a battery 16 also integrated in the device housing 4.

The hearing device 2 can be coupled for signaling to an operating and display device 18, in particular to a smart phone.

Figure 2:
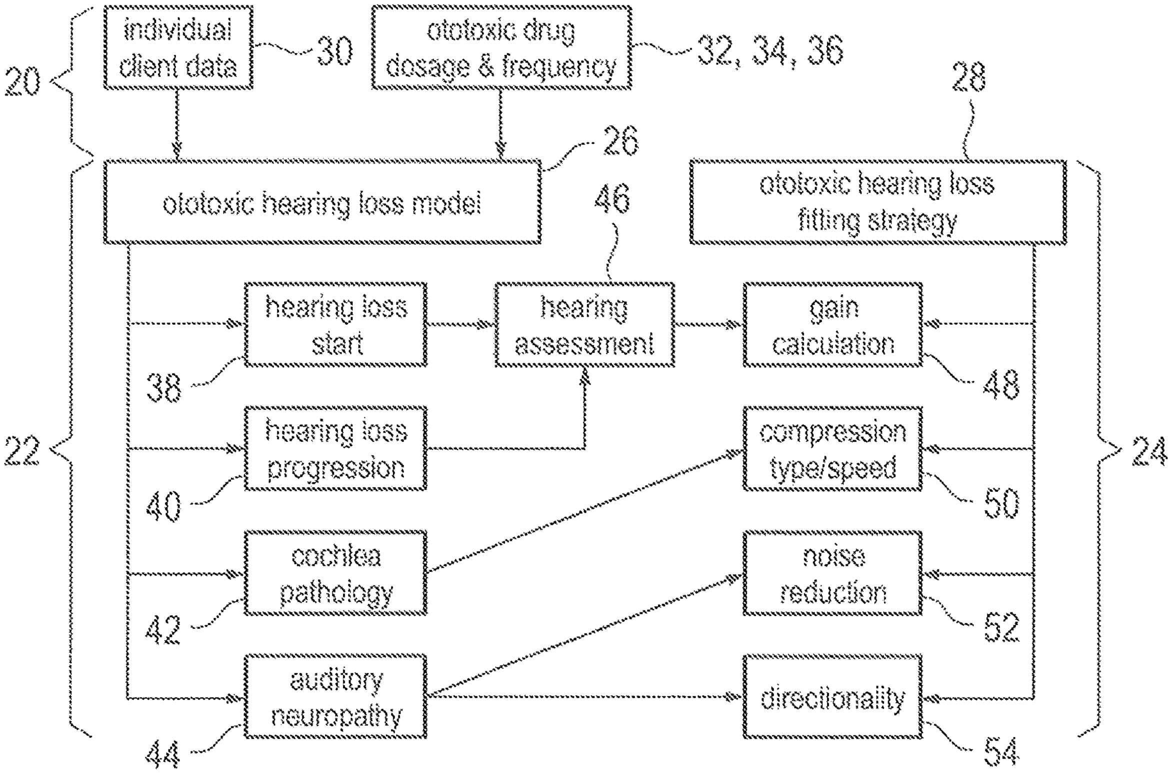
FIG. 2 shows a flow chart for a method for fitting the hearing device.

A method for fitting the hearing device 2 is explained in more detail hereinafter on the basis of FIG. 2. The method is carried out, for example, by a controller of the signal processing device 10 and/or by means of an app of the smart phone 18. For example, it is also conceivable that the controller is integrated in the smart phone 18. The method is provided in this case for operating the hearing device 2 when the (hearing device) user carries out a treatment using an ototoxic medication or active ingredient.

It is provided according to the method that in the course of the treatment of the hearing device user using an ototoxic medication or using an ototoxic active ingredient, an observation step 20 and a forecast step 22 and also a fitting step 24 are carried out.

The forecast step 22 is essentially a model for an ototoxic hearing loss (ototoxic hearing loss model) 26, wherein a corresponding fitting formula 28 or fitting strategy (ototoxic hearing loss fitting strategy) is stored for the fitting step 24.

Personal data 30 of the user (individual client data), for example health data of the user, and the dose 32 and consumption frequency 34 and the consumed ototoxic medication (or the active ingredient) 36 are supplied as input or treatment parameters to the model in the observation step 20.

On the basis of the model 26, an (expected/probable) beginning of the hearing loss 38 (hearing loss start) and a (future) progression of the hearing loss 40 (hearing loss progression) as well as a resulting change of the cochlea pathology 42 and a risk of auditory neuropathy 44 are determined.

Around the point in time of the beginning of the predicted hearing loss 38, the hearing device 2 or the app carries out regular hearing threshold checks or hearing threshold tests 46 (hearing assessment). The hearing threshold tests 46 or the frequency thereof are determined in this case in dependence on the predicted beginning of the hearing loss 38 and the predicted course or the progression of the hearing loss 40. Thus, for example, a video clip is shown on the app or tone-based or noise-based audiometry is carried out.

A compensation of the hearing loss is performed on the basis of the audiometric threshold values thus determinable. For this purpose, corresponding hearing device settings or settings of the signal processing device 10 are effectuated by means of the fitting formula 28. The fitting formula 28 determines, for example, a corresponding signal amplification 48 (gain calculation) and a respective required compression setting 50 (compression type/speed) as well as a noise suppression 52 (noise reduction) and a setting of the directionality or directional characteristic 54 (directionality).

The determination of the signal amplification 48 is carried out in this case in particular in consideration of the hearing threshold checks 46 or the hearing thresholds determined thereby, wherein the ototoxically changed cochlea pathology 42 is used in the determination of the compression settings 50. The risk of auditory neuropathy 44 is taken into consideration here both for the setting of the noise suppression 52 and for the setting of the directionality 54.

The claimed invention is not restricted to the above-described exemplary embodiments. Rather, other variations of the invention can be derived therefrom by a person skilled in the art in the scope of the disclosed claims, without departing from the subject matter of the claimed invention. In particular, furthermore all individual features described in conjunction with the various exemplary embodiments in the scope of the disclosed claims are also combinable with one another in other ways without departing from the subject matter of the claimed invention.

LIST OF REFERENCE NUMERALS

2 hearing device
4 device housing
6 input transducer
8 input signal
10 signal processing device
12 output signal
14 output transducer
16 battery
18 operating and display device, smart phone
20 observation step
22 forecast step
24 fitting step
26 model
28 fitting formula
30 data
32 dose
34 consumption frequency
36 medication
38 beginning of the hearing loss
40 progress of the hearing loss
42 cochlea pathology
44 risk of auditory neuropathy
46 hearing threshold test
48 signal amplification
50 compression setting
52 noise suppression
54 directional characteristic

The invention claimed is:

1. A method of fitting a hearing device for a hearing device user, the hearing device including:

a) at least one input transducer for picking up an acoustic signal and converting the acoustic signal into an input signal;

b) a signal processing device for receiving the input signal and subjecting the input signal to signal processing and generating an output signal; and c) an output transducer for converting the output signal into a sound signal; and the method comprising:

setting or adapting the signal processing of the signal processing device in dependence on an ototoxic hearing loss of the hearing device user, and during a treatment of the hearing device user with an ototoxic substance:

in an observation step, detecting and storing at least one treatment parameter;

in a forecast step, forecasting an ototoxic hearing loss on a basis of the stored treatment parameter; and in a fitting step, setting or adapting a signal amplification in dependence on a forecasted ototoxic hearing loss.

2. The method according to claim 1, wherein the forecast step comprises using a model for the ototoxic hearing loss, and the fitting step comprises using a fitting formula for the ototoxic hearing loss.

3. The method according to claim 1, wherein the forecast step comprises forecasting an expected beginning of the ototoxic hearing loss and, in a period of time around the expected beginning, carrying out regular hearing threshold tests and setting the signal amplification on a basis of the hearing threshold tests.

4. The method according to claim 1, which comprises conducting the fitting step regularly for a course of the ototoxic hearing loss that was forecast in the forecast step.

5. A hearing system, comprising:

a hearing device having:

at least one input transducer for picking up an acoustic signal and converting the acoustic signal into an input signal;

a signal processing device for signal processing the input signal and generating an output signal; and an output transducer for converting the output signal into a sound signal; and a controller for setting or adapting the signal processing of the signal processing device in dependence on an ototoxic hearing loss of a hearing device user, said controller being configured in a course of a treatment of the hearing device user with an ototoxic substance, to carry out:

a) an observation step for detecting and storing at least one treatment parameter;

b) a forecast step for forecasting an ototoxic hearing loss on a basis of the stored treatment parameter; and c) a fitting step for setting or adapting a signal amplification in dependence on a forecasted ototoxic hearing loss.

6. The hearing system according to claim 5, wherein said hearing device is coupled for signaling to an operating and display device, wherein application software is installed on the operating and display device, and said operating and display device is configured to at least partially carry out a method of fitting the hearing device for a hearing device user, wherein the hearing device comprises:

a) at least one input transducer for picking up an acoustic signal and converting the acoustic signal into an input signal;

b) a signal processing device for receiving the input signal and subjecting the input signal to signal processing and generating an output signal; and c) an output transducer for converting the output signal into a sound signal; and wherein the method comprises:

setting or adapting the signal processing of the signal processing device in dependence on an ototoxic hearing loss of the hearing device user, and during a treatment of the hearing device user with an ototoxic substance:

in an observation step, detecting and storing at least one treatment parameter;

in a forecast step, forecasting an ototoxic hearing loss on a basis of the stored treatment parameter; and in a fitting step, setting or adapting a signal amplification in dependence on a forecasted ototoxic hearing loss.

7. A computer program product comprising non-transitory computer-executable software code on a data carrier for carrying out the method according to claim 1 when the software code is executed on a computer.

* * * * *